Oct. 23, 1923.
E. D. TILLYER ET AL
1,471,368
OPHTHALMIC LENS
Filed April 22, 1921
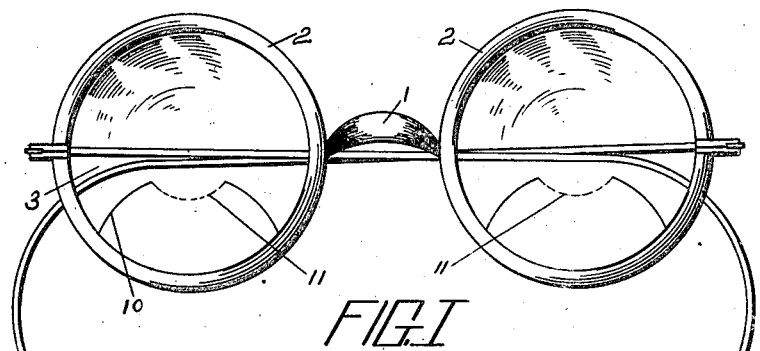
FIG.I
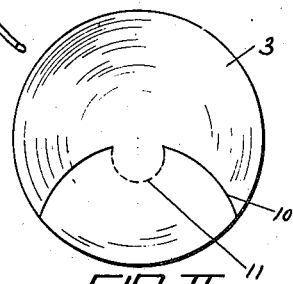
FIG.II
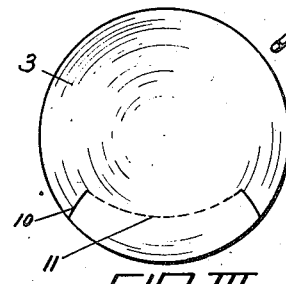
FIG.III
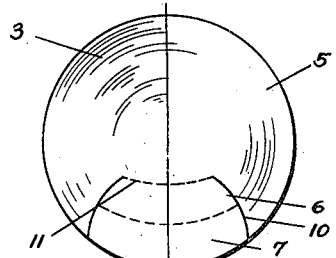
FIG.IV
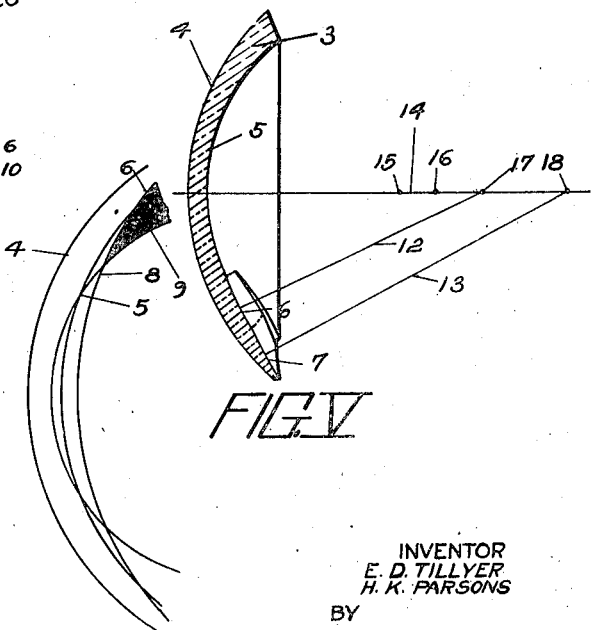
FIG.V
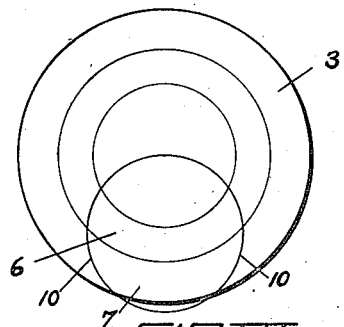
FIG.VI
FIG.VII
INVENTOR
E. D. TILLYER
H. K. PARSONS
BY
H. H. Styll & H. K. Parsons
ATTORNEY Patented Oct. 23, 1923.

1,471,368

UNITED STATES PATENT OFFICE.

EDGAR D. TILLYER AND HAROLD K. PARSONS, OF SOUTHBRIDGE, MASSACHUSETTS, ASSIGNORS TO AMERICAN OPTICAL COMPANY, OF SOUTHBRIDGE, MASSACHUSETTS, A VOLUNTARY ASSOCIATION OF MASSACHUSETTS.

OPHTHALMIC LENS.

Application filed April 22, 1921. Serial No. 463,542.

*To all whom it may concern:*

Be it known that we, EDGAR D. TILLYER and HAROLD K. PARSONS, citizens of the United States, residing at Southbridge, in the county of Worcester and State of Massachusetts, have invented certain new and useful Improvements in Ophthalmic Lenses, of which the following is a specification.

This invention relates to improvements in ophthalmic lenses and has particular reference to lenses of the bifocal or multifocal type.

One of the principal objects of our present invention is the provision of an improved type of multifocal lens which will insure maximum usability of both sections of the lens at points immediately adjacent the line of division between any two fields.

A further object of the present invention is the provision of a multifocal lens in which the upper portion or portions immediately adjacent the line of division between two fields may be used for reading and for lateral vision as well as vision directly through the middle.

A further object of the present invention is the provision of a novel and improved construction of multifocal lens which will permit of a plurality of different foci being positioned on the lens each of which shall have a distinct continuous zone which if desired may be caused to merge into the adjacent zone or focal power at the central portion, and which at the same time may also be so constructed and related to the remainder of the lens that the lens as an entirety shall be substantially monocentric in character.

Other objects and advantages of our improved lens should be readily apparent by reference to the following specification taken in connection with the accompanying drawings, and it will be understood that we may make any modifications in the specific details of construction or combination and arrangement of parts shown and described within the scope of the appended claims without departing from or exceeding the spirit of our invention.

Figure I is a front view of an ophthalmic mounting embodying our improved lenses.

Figure II is a plan view of one form of our lens.

Figure III is a similar view of another form thereof.

Figure IV is a plan view of a trifocal lens.

Figure V is a diagrammatic sectional view as on the line V—V of Figure IV, bringing out the monocentric view of our lens.

Figure VI is a diagrammatic plan view illustrating the manner of grinding or producing our lens and the underlying principles making it possible.

Figure VII is a diagrammatic sectional view bringing out the features illustrated in connection with Figure VI.

In the drawings, the numeral 1 designates the bridge of an ordinary ophthalmic mounting having the frame portions 2 holding our improved lenses. These lenses may be considered as comprising a blank or disc designated as an entirety by the numeral 3 having on one side preferably a single continuous curve 4 and on the opposite side a plurality of curves such as 5, 6 and 7, as illustrated in connection with Figures IV and V.

Prior to our invention there have been two known forms of one-piece bifocals, one known as the old or upcurve form, in which a portion of a convex surface was slabbed off leaving an upcurved line of division between the two fields, the slabbed off portion forming the distance vision surface and the lens being quite undesirable on account of the prism present in the upper portion. The other known form is what is commonly termed the downcurve bifocal, in which a circle or segment of a circle in the form of an arch is the line of division between the two surfaces. This construction is subject to certain disadvantages, particularly due to the fact that with the downcurve at the line of division there is but a small segment of the circle so that while as the eye passes over the line of division looking directly forward the second or ordinarily the reading portion of the lens may be used, but it is impossible to use it in reading with the eye passing from side to side as the eye will tend to pass over the line of division onto the distance vision field, so that for reading it is necessary to drop the eye an appreciable distance below the division line. This is a disadvantage, as will be noted by observation of wearers of glasses, in that it will be frequently noted that they have to either perceptibly tilt the head downward to see comfortably directly forward through the distance portion of the lens or tilt the head backward to see through the lower portion for reading.

It is one of the purposes of our invention to obviate these difficulties by providing a straighter line of division so that when the eye passes from one field to the other it immediately has a wide usable range sufficient for all ordinary requirements. This makes it possible for the eye in all its work to use more nearly the central portion of the lens, as should be readily understood for example by reference to Figure I of the drawings.

The manner of producing our improved form of bifocal lens will probably be best understood by reference to Figures VI and VII of the drawings, where the method of construction has been diagrammatically illustrated. In the formation of a lens of the modern or present day type it is customary and in fact necessary in order to secure the best results, that the same be of what may generically be termed meniscus or saucer like formation as distinguished from flat. A lens or lens blank of this character will have one curve, as for instance the single continuous curve 4 on the front face and may be formed with a plurality of curves on the rear face. In the ordinary bifocal production it has in the past been customary to make the lens in what is known as target formation, that is, the inner face of the disc is formed with a central or bull's eye portion of less concave curve to provide the reading focus, and with an outer more concave curve forming the weaker or distance portion. This process we, in the production of our improved bifocal, entirely reverse, in that we form the lens with the initial inner strongly concave curve 5 and then in effect as illustrated by the diagrammatic views, taking a less concave tool 8 flatten out the edge portion as indicated by the shading at 9, to produce the second curve 6 carrying this down to the desired depth. Then if desired a third still flatter tool may be employed to form the zone 7. It is, of course, to be understood that Figure VII has been greatly exaggerated to give an understanding of the general principles involved, and that in actual manufacture an entire disc is not slabbed off in the manner indicated, but only a portion of the disc enclosed between the lines 10—10, which may be continued to join as a complete circle, or may only form bounding lines connected by an intermediate reversely curved circular portion 11. This result is accomplished by slabbing or cutting off through abrasion or grinding away of the portion 9, as indicated in Figure VII, by a tool of the diameter of the space enclosed by the lines 10—10, or having a travel which makes it describe a circle of that diameter, and which when operating upon the lens is disposed at such an angle that its axis of rotation, 12 or 13, as the case may be, will fall on the general axis 14 common to the curves 4, 5, 6 and 7, having respectively their centers 15, 16, 17 and 18 all lying on said axis. It will be understood that if desired one or more of these centers may be made to lie in a different relation than on this center line, this being the ideal relationship which will produce an absolutely monocentric lens. It will be understood, however, that by dropping, for example, the center 18 somewhat downward it would then be possible to produce a lens which was monocentric as respects the fields 5 and 6, and in which the field 7 would be so related to the field 6 that there would be no noticeable prismatic effect or jump in passing over the line onto the third visual surface. In any event, it will be understood by those conversant with the art of forming lenses of this type that this relationship of axes will be such that the tool 8 will not fit uniformly against the surface 5, or in other words will not contact therewith initially in a circular outline if operating only upon the surface enclosed by the lines 10, but will begin bearing at the outer edge first and will cut down through said outer edge forming a variable depth cliff along the lines 10—10, the height of the cliff being greatest at the edge of the blank and gradually decreasing toward the center. If the grinding be continued sufficiently the circle bounded by the lines 10—10 will finally be completed at the center, but if the grinding be stopped at any point before the center is reached the two lines 10—10 will merge into the surface 5 and there will be a central connecting portion in the form of a downcurve or reversed latch, as indicated at 11 in several of the figures, which will be a merged line of joinder between the two fields so that there will be no cliff or jump at this point.

Our improved lens, therefore, possesses these decided advantages over anything known in the prior art: First, that through our invention it is possible to produce a monocentric bifocal lens having a merged line of joinder; second, that through our invention it is possible to produce a bifocal lens having no undesirable prismatic effects at the line of joinder of the two fields, but which on the other hand possesses a wide lateral visual range through both fields immediately adjacent the line of joinder, thus affording better vision at this point than has hitherto been accomplished;

third, that by our improvement we produce a lens in which a plurality of different visual fields may be provided in a single piece of glass, each of which will at the point of transition of the eye from one surface to the other, be merged with the adjacent surface, will be free from disagreeable prismatic effects, and will possess a wide usable visual field.

We claim:

1. A multifocal lens comprising major and minor fields, said fields being centrally separated one from the other by a reverse arch, and being laterally separated from each other by downwardly curving division shoulders.

2. A one-piece multifocal lens comprising a blank having a convex curve on one side and concave curves of different radii on the opposite side, said curves centrally merging in an upcurve line of joinder, and laterally joining in a variable ridge.

3. A monocentric bifocal lens formed from a single piece of glass having a large major portion and a minor portion partially enclosed by the major portion through the medium of downwardly curving cliffs of gradually increasing height, said curves merging at their upper portions with the distant field, and being connected by a drooping merged line of joinder near the optical center of the lens.

4. The process of producing a one-piece bifocal lens consisting in forming a concave major surface on a blank, and subsequently removing a portion of said surface by a tool disposed at an angle to the radii of the original surface, and stopping the action of the tool before it has reached the central portion of the lens in the vertical meridian whereby an upcurved merged central division line between the two fields is produced.

5. The process of producing a bifocal lens consisting in forming a concave surface for the major portion of the lens and laterally removing a fragment of a zone at one edge of the lens to produce a surface of different curvature having a merged upcurve line of joinder with the main visual field.

6. The process of producing a multifocal lens consisting in forming a major blank with a concave surface on one side thereof, removing bands or zones at the edge portion of the said surface limited by a predetermined enclosing circle.

7. The process of producing a multifocal lens consisting in forming a major blank with a concave surface on one side thereof, removing bands or zones at the edge portion of the said surface limited by a predetermined enclosing circle, establishing the common centre of two of the surfaces on the concave side, and forming a curve on the opposite side of the blank having its center on the axis so established whereby a monocentric one-piece lens is produced.

8. A multifocal lens, comprising a major portion and an enclosed minor portion of different focus than the major portion, said lens having a merged upcurve line of joinder between the adjacent multifocal surfaces, and downwardly curving lines forming the lateral separations between the fields.

9. A multifocal lens, comprising a major portion and an enclosed minor portion of different focus than the major portion, said lens having a merged upcurve line of joinder between the adjacent fields, and downwardly curving variable ridges forming the lateral separations between the fields.

In testimony whereof we have affixed our signatures, in presence of two witnesses.

EDGAR D. TILLYER.
HAROLD K. PARSONS.

Witnesses:
SUSAN CASAZZA,
ALICE G. HASKELL.